(12) United States Patent
Lee et al.

(10) Patent No.: US 7,864,778 B2
(45) Date of Patent: Jan. 4, 2011

(54) APPARATUS AND METHOD OF SCHEDULING DATA PACKET IN A COMMUNICATION SYSTEM

(75) Inventors: Jae-Ho Lee, Suwon-si (KR); Jeong-Ho Lee, Suwon-si (KR); Jung-Won Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 421 days.

(21) Appl. No.: 11/769,317

(22) Filed: Jun. 27, 2007

(65) Prior Publication Data

US 2007/0297415 A1 Dec. 27, 2007

(30) Foreign Application Priority Data

Jun. 27, 2006 (KR) ...................... 10-2006-0058338

(51) Int. Cl.
*H04L 12/28* (2006.01)
(52) U.S. Cl. .................................................. 370/395.4
(58) Field of Classification Search ................ 370/351, 370/389, 395.1, 395.4, 395.42, 395.43, 229, 370/230, 231, 235, 238
See application file for complete search history.

(56) References Cited

U.S. PATENT DOCUMENTS

| | | | |
|---|---|---|---|
| 5,699,521 A | 12/1997 | Iizuka et al. | |
| 7,072,295 B1 * | 7/2006 | Benson et al. | ............... 370/230 |
| 2003/0142624 A1 | 7/2003 | Chiussi et al. | |
| 2003/0189943 A1 * | 10/2003 | Gorti et al. | ................... 370/412 |
| 2004/0141512 A1 | 7/2004 | Komagata et al. | |
| 2005/0094643 A1 | 5/2005 | Wang et al. | |
| 2005/0135291 A1 * | 6/2005 | Ketchum et al. | ............. 370/319 |
| 2007/0002750 A1 * | 1/2007 | Sang et al. | ................... 370/238 |
| 2007/0280260 A1 | 12/2007 | Ryu et al. | |

FOREIGN PATENT DOCUMENTS

| | | |
|---|---|---|
| EP | 1 549 002 | 6/2005 |
| JP | 2003-032297 | 1/2003 |
| JP | 2003-529291 | 9/2003 |
| JP | 2004-007740 | 1/2004 |
| JP | 2004-228777 | 8/2004 |
| JP | 2005-073011 | 3/2005 |
| JP | 2005-244290 | 9/2005 |
| KR | 1020050022197 | 3/2005 |
| KR | 1020050066632 | 6/2005 |
| KR | 1020060020812 | 3/2006 |
| WO | WO 01/74027 | 12/2001 |

\* cited by examiner

*Primary Examiner*—Kwang B Yao
*Assistant Examiner*—Obaidul Huq
(74) *Attorney, Agent, or Firm*—The Farrell Law Firm, LLP

(57) ABSTRACT

An apparatus and method of scheduling data packets in a communication system are provided, in which the number of first-type data packets to be transmitted with priority is determined according to a predetermined criterion from among total first-type data packets, and the determined number of first-type data packets and second-type data packets are scheduled so as to transmit the determined number of first-type data packets and then transmit the second-type data packets.

12 Claims, 3 Drawing Sheets

APPARATUS AND METHOD OF SCHEDULING DATA PACKET IN A COMMUNICATION SYSTEM

PRIORITY

This application claims priority under 35 U.S.C. §119(a) to a Korean Patent Application filed in the Korean Intellectual Property Office on Jun. 27, 2006 and assigned Serial No. 2006-58338, the contents of which are hereby incorporated by reference.

BACKGROUND OF THE INVENTION

1. Field of the Invention

The present invention generally relates to a communication system. More particularly, the present invention relates to an apparatus and method of scheduling data packet in a communication system.

2. Description of the Related Art

FIG. 1 is a schematic view illustrating the configuration of a typical communication system.

Referring to FIG. 1, the communication system has a multi-cell structure. That is, the communication system includes cells 100 and 150, a Base Station (BS) 110 covering the cell 100, BS 140 covering the cell 150, and a plurality of Mobile Stations (MSs) 111, 113, 130, 151 and 153.

The communication system is being developed to additionally provide high-speed large-data packet transmission service to MSs, especially services with a variety of Quality of Service (QoS) requirements. Parameters that determine the QoS of data packets are allowed transmission delay time, fading characteristics, a closeness between a transmitter and a receiver, and a use or a non-use of diversity. Therefore, for reliable data packet transmission and reception, data packets should be scheduled in a manner taking into account a QoS of the data packets.

FIG. 2 is a flowchart illustrating an operation in a scheduler for scheduling data packets so as to satisfy the QoS requirements of the data packets, which are determined according to allowed transmission delay time of the data packets in a typical communication system.

As QoS levels are determined according to allowed transmission delay time, data packets are categorized into real-time data packets and non-real time data packets. If the data packets can be packed the scheduler schedules the data packets according to the number of data packet connections. If the data does not allow for packing, the scheduler schedules the data packets according to the number of the data packets. For convenience' sake, it is assumed that the scheduler schedules data packets according to the number of the data packets, and the scheduling is carried out on a frame basis in the illustrated case of FIG. 2.

Referring to FIG. 2, thus, the scheduler monitors the presence or absence of real-time data packets at a scheduling time in step 211. In the absence of real-time data packets, the scheduler prioritizes non-real time data packets for transmission and schedules the non-real time data packets according to their priority levels in step 213. Then the scheduler ends the algorithm.

In the presence of real-time data packets in step 211, the scheduler prioritizes real-time data packets for transmission and schedules the real-time data packets according to their priority levels in step 215. Then, in step 217, the scheduler prioritizes the non-real time data packets for transmission and schedules the non-real time data packets according to their priority levels. The scheduler ends the algorithm.

As described above, when the scheduler schedules data packets so as to satisfy the QoS levels of the data packets which have been determined taking into account the allowed transmission time of the data packets, scheduling of non-real time data packets follows scheduling of real-time data packets in the typical communication system. Because it is important to keep the probability of failing to transmit real-time data packets within an allowed transmission time at or below a predetermined value, the real-time data packets takes priority over non-real time data packets in transmission.

However, the wireless channel environment under which the communication system is usually placed varies with data packet transmission speeds of MSs. To improve a total performance of the communication system, it is preferable to transmit data packets when the wireless channel environment becomes good. If scheduling is performed such that non-real time data packets are always behind real-time data packets in priority, even though a sufficient allowed transmission delay time is left for the real-time data packets in a relatively poor wireless channel environment, the real-time data packets take priority over the non-real time data packets. In the opposite case, even when the wireless channel environment is relatively good, if no resources are available for the non-real time data packets after scheduling the real-time data packets, transmission of the non-real time data packets is impossible.

Accordingly, there exists a need for a new scheduling method that considers a wireless channel environment in addition to allowed transmission delay time.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide an apparatus and method of scheduling data packets in a communication system.

Another aspect of exemplary embodiments of the present invention provides an apparatus and method of scheduling data packets, taking into account a wireless channel environment in a communication system.

A further aspect of exemplary embodiments of the present invention provides an apparatus and method of scheduling data packets, taking into account allowed transmission delay time in a communication system.

In accordance with an aspect of the present invention, there is provided a method of scheduling data packets in a data packet scheduling apparatus in a communication system, in which a number of first-type data packets to be transmitted with a priority is determined according to a predetermined criterion from among total first-type data packets, and the determined number of first-type data packets and second-type data packets are scheduled so as to transmit the determined number of first-type data packets and then transmit the second-type data packets.

In accordance with another aspect of the present invention, there is provided a data packet scheduling apparatus in a communication system, in which a scheduler determines a number of first-type data packets to be transmitted with a priority according to a predetermined criterion from among total first-type data packets, and schedules the determined number of first-type data packets and second-type data packets so as to transmit the determined number of first-type data packets and then transmit the second-type data packets.

In accordance with a further aspect of the present invention, there is provided a method of scheduling data packets in a data packet scheduling apparatus in a communication system, in which real-time data packets are grouped into real-time data packet groups according to allowed transmission delay time of the real-time data packets, the number of real-time data packets to be transmitted with priority in each of the real-time data packet groups is determined according to a predetermined criterion, the determined numbers of real-time data packets of the real-time data packet groups are prioritized, and the determined numbers of real-time data packets are scheduled to transmit the determined numbers of real-time data packets according to priority levels of the determined numbers of real-time data packets.

In accordance with still another aspect of the present invention, there is provided a data packet scheduling apparatus in a communication system, in which a scheduler groups real-time data packets into real-time data packet groups according to allowed transmission delay time of the real-time data packets, determines a number of real-time data packets to be transmitted with priority according to a predetermined criterion in each of the real-time data packet groups, prioritizes the determined numbers of real-time data packets of the real-time data packet groups, and schedules the determined numbers of real-time data packets to transmit the determined numbers of real-time data packets according to priority levels of the determined numbers of real-time data packets.

BRIEF DESCRIPTION OF THE DRAWINGS

The above and other objects, features and advantages of certain exemplary embodiments of the present invention will be more apparent from the following detailed description taken in conjunction with the accompanying drawings, in which.

DETAILED DESCRIPTION OF EXEMPLARY EMBODIMENTS

Figure 1:
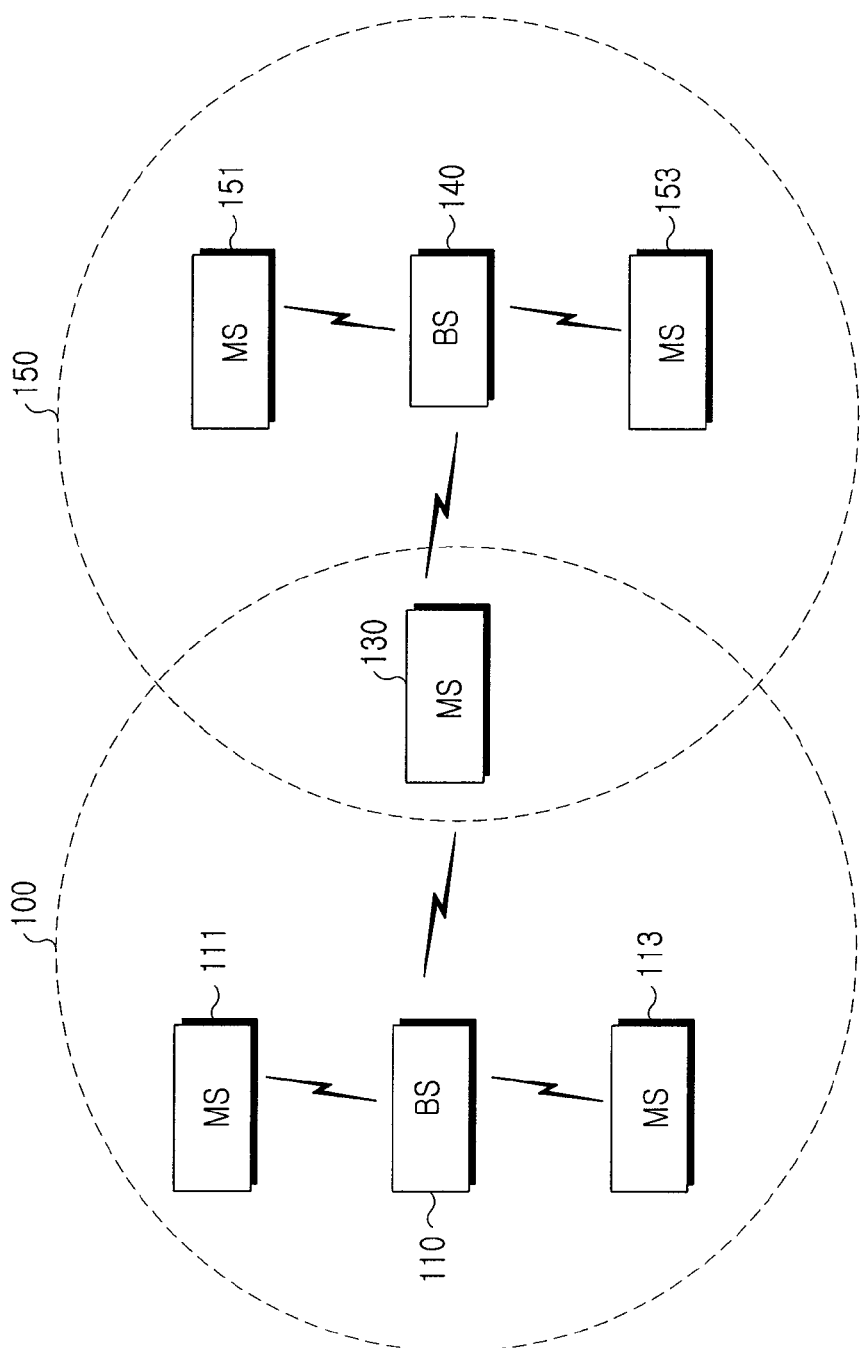
FIG. 1 illustrates the configuration of a typical communication system.
Figure 2:
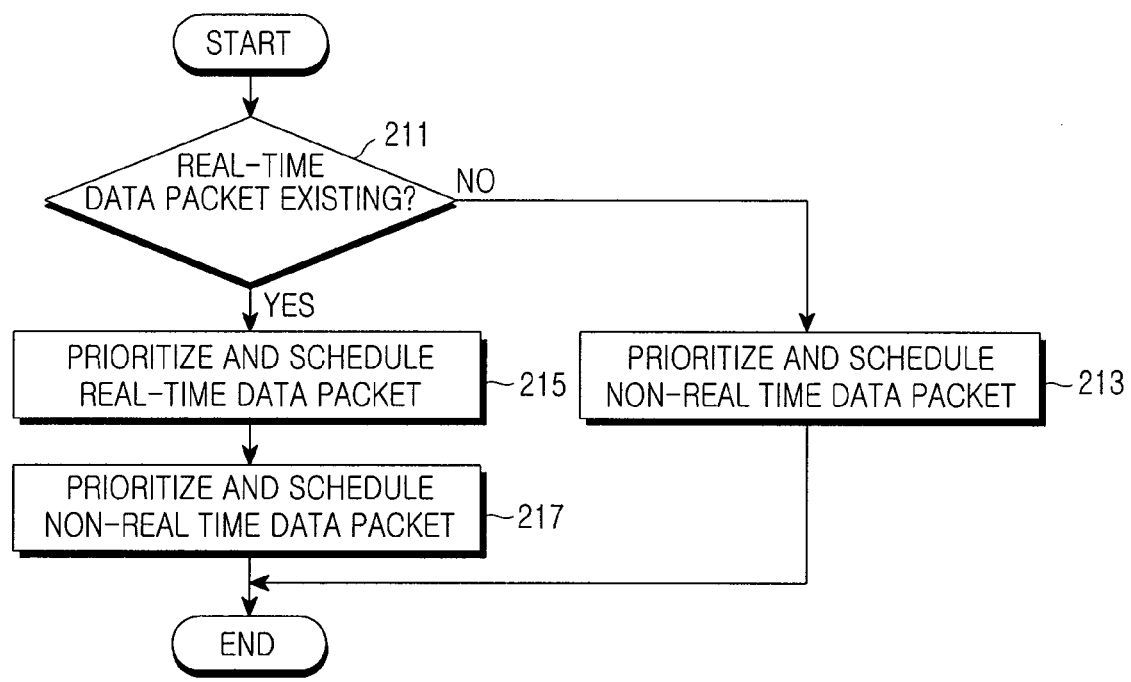
FIG. 2 is a flowchart illustrating an operation in a scheduler of scheduling data packets so as to satisfy QoS requirements of the data packets, which are determined according to the allowed transmission delay time of the data packets in the typical communication system.

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Throughout the drawings, the same drawing reference numerals will be understood to refer to the same elements, features and structures.

Figure 3:
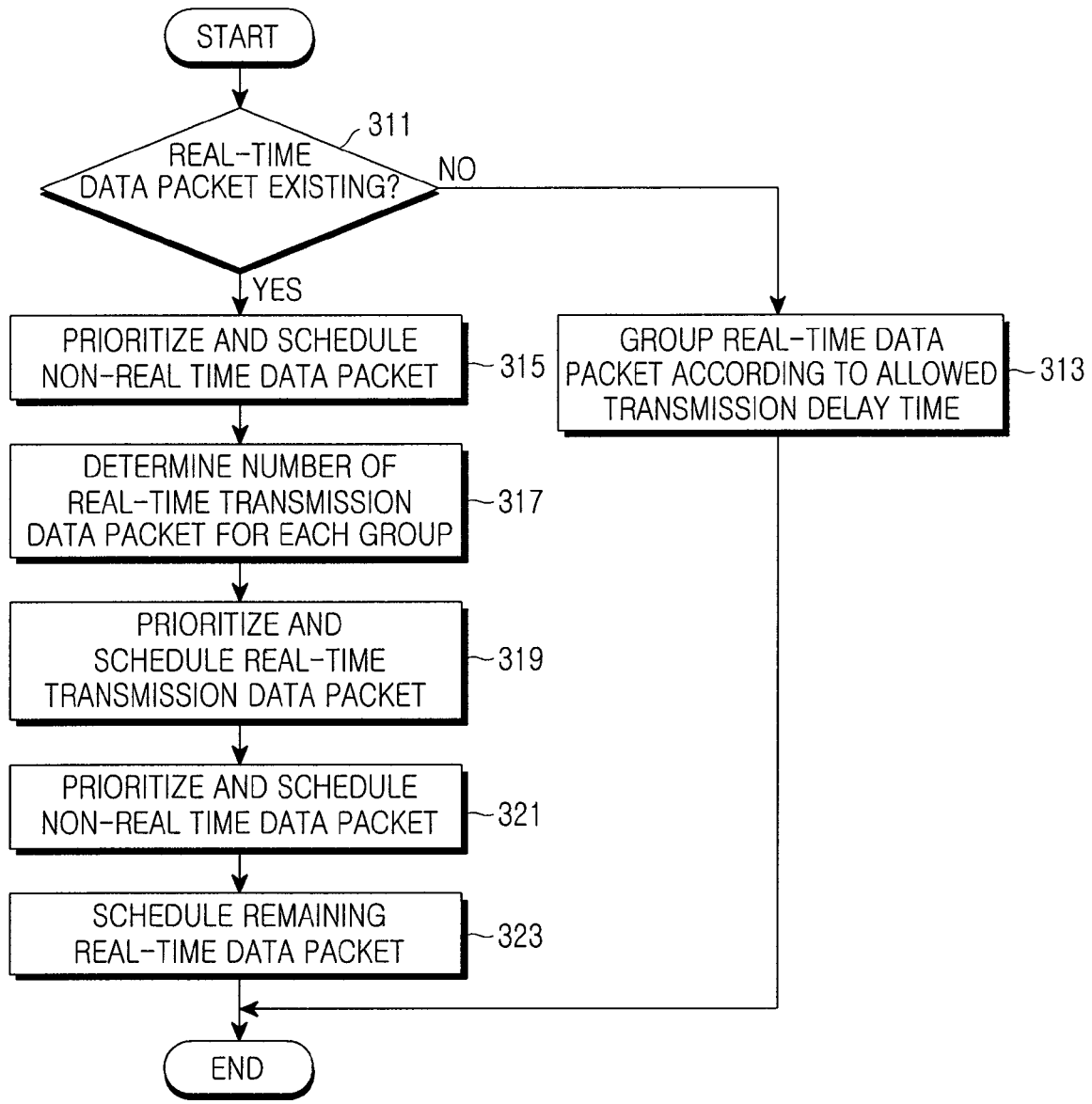
FIG. 3 is a flowchart illustrating an operation in a scheduler of scheduling data packets so as to satisfy QoS requirements of the data packets, which are determined according to the allowed transmission delay time of the data packets in a communication system according to the present invention.

FIG. 3 is a flowchart illustrating an operation in a scheduler of scheduling data packets so as to satisfy the QoS requirements of the data packets which are determined according to the allowed transmission delay time of the data packets in a communication system according to an exemplary embodiment of the present invention.

As QoS levels are determined according to allowed transmission delay time, data packets are categorized into real-time data packets and non-real time data packets. If data packets can be packed, the scheduler schedules the data packets according to the number of data packet connections. If the data packets do not allow for packing, the scheduler schedules the data packets according to the number of the data packets. For convenience, it is assumed that the scheduler schedules data packets according to the number of the data packets, and the scheduling is carried out on a frame basis in the illustrated case of FIG. 3.

Referring to FIG. 3, thus, the scheduler monitors the presence or absence of real-time data packets at a scheduling time in step 311. In the absence of real-time data packets, the scheduler prioritizes non-real time data packets for transmission and schedules the non-real time data packets according to their priority levels in step 313. Then the scheduler ends the algorithm.

In the presence of real-time data packets in step 311, the scheduler groups the real-time data packets according to their allowed transmission delay time in step 315. The grouping will be described in more detail.

The real-time data packets should be transmitted within their allowed transmission delay time and may have different allowed transmission delay time. Therefore, the scheduler groups real-time data packets with the same allowed transmission delay time into one group. In this manner, the total real-time data packets can be grouped according to their allowed transmission delay time.

After the grouping, the scheduler determines the number of real-time data packets to be scheduled in each group, for transmission in a frame according to Equation (1) in step 317. The real-time data packets to be scheduled for transmission in a frame is called "real-time transmission data packet".

$$\text{number of real} - \text{time transmission data packets} = \text{ceil}\left(\frac{\text{number of total real} - \text{time data packets}}{\frac{\text{allowed transmission delay time}}{\textit{framelength}}} \times \text{allocation ratio}\right) \quad (1)$$

where $$\frac{\text{allowed transmission delay time}}{\textit{framelength}}$$

denotes a total allocation opportunity available for real-time data packet transmission and allocation ratio is a weight. If the allocation ratio is 1, this means that there is no margin in transmitting the real-time data packets. If the allocation ratio is less than 1, this means that the total allocation opportunity is less than a reference allocation opportunity, thus increasing the probability of transmitting the real-time data packets with a delay time longer than the allowed transmission delay time. Thus, the allocation ratio is 1 or above, preferably. If the allocation ratio is equal to or larger than $$\frac{\text{allowed transmission delay time}}{\textit{framelength}},$$

this means that real-time data packets unconditionally take priority over non-real time data packets in transmission, as done in conventional real-time data packet transmission.

Then, the scheduler prioritizes the real-time transmission data packets of the real-time data packet groups in step 319. The prioritization can be performed in various ways. One of them is to prioritize the real-time data packet groups so that the highest priority level is given to a real-time data packet group with the shortest allowed transmission delay time. Another way is to prioritize the real-time transmission data packets of the real-time data packet groups according to priority levels given to all the real-time data packets of the real-time data packet groups by the scheduler.

In step 321, the scheduler prioritizes the non-real time data packets for transmission and schedules the non-real time data packets according to their priority levels. In step 323, the scheduler prioritizes the remaining real-time data packets except the already-scheduled real-time transmission data packets in each group. The scheduler ends the process.

For example, if data packets to be scheduled for transmission in a frame include real-time data packets and non-real time data packets, the real-time data packets have the same allowed transmission delay time, thus being grouped into one group, and the number of the real-time data packets is A, the scheduler determines the number A' of real-time transmission data packets according to Equation (1). Thus, the scheduler transmits the A' real-time data packets with priority from among the A real-time data packets, transmits the non-real time data packets, and then schedules the remaining A-A' real-time data packets, for transmission.

As is apparent from the above description, the present invention enables scheduling to be performed taking into account a wireless channel environment as well as allowed transmission delay time. Therefore, the total performance of a communication system is increased.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method of scheduling data packets in a data packet scheduling apparatus containing a scheduler in a communication system, comprising:
    determining by the scheduler a number of real-time data packets to be transmitted with priority according to an allowed transmission delay time from among a total of real-time data packets;
    scheduling by the scheduler the determined number of the real-time data packets and non-real time data packets so as to transmit the determined number of the real-time data packets and then transmit the non-real time data packets; and
    scheduling remaining real-time data packets other than the determined number of the real-time data packets after the scheduling of the non-real time data packets, so as to transmit the remaining real-time data packets after the non-real time data packets,
    wherein, when a data packet scheduling period is a frame, the number determination comprises determining a number of the real-time data packets to be transmitted with priority among the real-time data packets according, to the allowed transmission delay time, a frame length, and an allocation ratio being a weight for real-time data packet transmission.

2. The method of claim 1, wherein when a data packet scheduling period is a frame, the number determination comprises determining a number of the real-time data packets to be transmitted with priority among the real-time data packets according to, $$\text{number of real}-\text{time transmission data packets} = \text{ceil}\left(\frac{\frac{\text{number of total real}-\text{time data packets}}{\text{allowed transmission delay time}}}{\text{framelength}} \times \text{allocation ratio}\right)$$

where $$\frac{\text{allowed transmission delay time}}{\text{framelength}}$$

denotes a total allocation opportunity available for a real-time data packet transmission and allocation ratio is a weight for the real-time data packet transmission.

3. A communication system comprising:
    at least one Mobile Station for receiving data packet transmissions; and
    an apparatus comprising a scheduler for determining a number of real-time data packets to be transmitted with priority according to an allowed transmission delay time from among a total of real-time data packets, scheduling the determined number of the real-time data packets and non-real time data packets so as to transmit the determined number of the real-time data packets and then transmit the non-real time data packets, and scheduling remaining real-time data packets other than the determined number of the real-time data packets after scheduling the non-real time data packets, so as to transmit the remaining real-time data packets after the non-real time data packets,
    wherein, when a data packet scheduling period is a frame, the scheduler determines a number of the real-time data packets to be transmitted with priority among the real-time data packets according to the allowed transmission delay time, a frame length, and an allocation ratio being a weight for real-time data packet transmission.

4. The communication system of claim 3, wherein when a data packet scheduling period is a frame, the scheduler determines the number of the real-time data packets to be transmitted with priority among the real-time data packets according, $$\text{number of real}-\text{time transmission data packets} = \text{ceil}\left(\frac{\frac{\text{number of total real}-\text{time data packets}}{\text{allowed transmission delay time}}}{\text{framelength}} \times \text{allocation ratio}\right)$$

where $$\frac{\text{allowed transmission delay time}}{\text{framelength}}$$

denotes a total allocation opportunity available for a transmission of the real-time data packets and allocation ratio is a weight for the real-time data packet transmission.

5. A method of scheduling data packets in a data packet scheduling apparatus containing a scheduler in a communication system, comprising:
    grouping by the scheduler real-time data packets with a same allowed transmission delay time of the real-time data packets into real-time data packet groups;
    determining by the scheduler a number of the real-time data packets to be transmitted with priority according to a predetermined criterion in each of the real-time data packet groups;

prioritizing by the scheduler the determined numbers of the real-time data packets of the real-time data packet groups and scheduling the determined number of the real-time data packets to transmit the determined number of the real-time data packets according to priority levels of the determined number of the real-time data packets and then transmitting non-real time data packets; and scheduling remaining real-time data packets other than the determined number of the real-time data packets in each real-time data packet group, for transmission after the scheduling of the non-real time data packets, so as to transmit the remaining real-time data packets after the non-real time data packets, wherein, when a data packet scheduling period is a frame, the number determination comprises determining the number of the real-time data packets to be transmitted with priority according to a total number of the real-time data packets, the allowed transmission delay time, a frame length, and an allocation ratio being a weight for real-time data packet transmission.

6. The method of claim 5, wherein the prioritization comprises prioritizing the real-time data packet groups so that a highest priority level is given to a real-time data packet group having the shortest allowed transmission delay time.

7. The method of claim 5, wherein the prioritization comprises prioritizing the determined number of the real-time data packets of the real-time data packet groups, taking into account a total number of the real-time data packets of the real-time data packet groups.

8. The method of claim 5, wherein when a data packet scheduling period is a frame, the number determination comprises determining the number of the real-time data packets to be transmitted with priority according to, $$\text{number of real} - \text{time transmission data packets} = \text{ceil}\left(\frac{\text{number of total real} - \text{time data packets}}{\frac{\text{allowed transmission delay time}}{\text{framelength}}} \times \text{allocation ratio}\right)$$

where $$\frac{\text{allowed transmission delay time}}{\text{framelength}}$$

denotes a total allocation opportunity available for a real-time data packet transmission and allocation ratio is a weight for the real-time data packet transmission.

9. A communication system comprising:

at least one Mobile Station (MS) for receiving data packet transmissions; and an apparatus comprising a scheduler for grouping real-time data packets with the same allowed transmission delay time of the real-time data packets into real-time data packet groups, determining a number of the real-time data packets to be transmitted with priority according to a predetermined criterion in each of the real-time data packet groups, prioritizing the determined number of the real-time data packets of the real-time data packet groups, scheduling the determined number of the real-time data packets to transmit the determined number of the real-time data packets according to priority levels of the determined number of the real-time data packets, transmitting non-real time data packets, and scheduling remaining real-time data packets other than the determined number of the real-time data packets in each real-time data packet group, for transmission after the scheduling of the non-real time data packets, so as to transmit the remaining real-time data packets after the non-real time data packets, wherein, when a data packet scheduling period is a frame, the scheduler determines the number of the real-time data packets to be transmitted with a priority according to a total number of the real-time data packets, allowed transmission delay time, a frame length, and an allocation ratio being a weight for real-time data packet transmission.

10. The communication system of claim 9, wherein the scheduler prioritizes the real-time data packet groups so that a highest priority level is given to a real-time data packet group having the shortest allowed transmission delay time.

11. The communication system of claim 9, wherein the scheduler prioritizes the determined number of the real-time data packets of the real-time data packet groups, taking into account a total number of the real-time data packets of the real-time data packet groups.

12. The communication system of claim 9, wherein if a data packet scheduling period is a frame, the scheduler determines the number of the real-time data packets to be transmitted with priority according to, denotes a total allocation opportunity available for real-time data packet transmission and allocation ratio is a weight for the real-time data packet transmission.

* * * * *